US009341881B2

(12) United States Patent
Koelper et al.

(10) Patent No.: US 9,341,881 B2
(45) Date of Patent: May 17, 2016

(54) DEVICE FOR GENERATING POLARIZED ELECTROMAGNETIC RADIATION AND PROJECTOR

(71) Applicants: Christopher Koelper, Regensburg (DE); Reiner Windisch, Pettendorf (DE); Christopher Wiesmann, Fuerstenfeldbruck (DE); Julius Muschaweck, Gauting (DE)

(72) Inventors: Christopher Koelper, Regensburg (DE); Reiner Windisch, Pettendorf (DE); Christopher Wiesmann, Fuerstenfeldbruck (DE); Julius Muschaweck, Gauting (DE)

(73) Assignee: OSRAM GmbH, Munich (DE)

( * ) Notice: Subject to any disclaimer, the term of this patent is extended or adjusted under 35 U.S.C. 154(b) by 406 days.

(21) Appl. No.: 13/926,600

(22) Filed: Jun. 25, 2013

(65) Prior Publication Data

US 2013/0342769 A1 Dec. 26, 2013

(30) Foreign Application Priority Data

Jun. 25, 2012 (DE) .................. 10 2012 210 773

(51) Int. Cl.
*G02F 1/1335* (2006.01)
*G02B 27/28* (2006.01)
*G03B 21/14* (2006.01)
*G03B 21/20* (2006.01)
*H04N 9/31* (2006.01)

(52) U.S. Cl.
CPC ........ *G02F 1/133528* (2013.01); *G02B 27/283* (2013.01); *G02B 27/286* (2013.01); *G02F 1/13362* (2013.01); *G03B 21/14* (2013.01); *G03B 21/2073* (2013.01); *H04N 9/3167* (2013.01)

(58) Field of Classification Search
CPC .... G02B 27/283; G02B 27/286; G02B 27/28; G02B 5/3083; G02F 1/133528; G02F 1/1335
USPC .......... 353/20, 31, 37, 98; 349/5, 7–9, 62, 96, 349/117
See application file for complete search history.

(56) References Cited

U.S. PATENT DOCUMENTS

| 5,751,388 A * | 5/1998 | Larson .................. G02B 3/005 349/87 |
| 8,033,706 B1 | 10/2011 | Kelly et al. |
| 2003/0063261 A1* | 4/2003 | Li ........................ G02B 6/0006 353/20 |
| 2005/0046767 A1* | 3/2005 | Freking ................. B32B 43/006 349/62 |
| 2009/0195729 A1* | 8/2009 | Little ................... G02B 6/0053 349/64 |
| 2010/0134719 A1* | 6/2010 | Johns ..................... C23C 14/02 349/62 |
| 2011/0051052 A1* | 3/2011 | Tasaka .................. C09B 31/043 349/96 |
| 2012/0140148 A1 | 6/2012 | Kadowaki |
| 2013/0114027 A1* | 5/2013 | Hasegawa .............. G02B 5/305 349/96 |

FOREIGN PATENT DOCUMENTS

DE 699 19 746 9/2005
JP 2007-304460 11/2007

* cited by examiner

*Primary Examiner* — Sultan Chowdhury
(74) *Attorney, Agent, or Firm* — Cozen O'Connor

(57) ABSTRACT

Device for generating polarized electromagnetic radiation has a diffuser and a polarizer. The diffuser is arranged in a beam path of the electromagnetic radiation. The polarizer is arranged in the beam path of the electromagnetic radiation, to be precise downstream of the diffuser in the direction of propagation of the electromagnetic radiation. The polarizer has a reflective side facing the diffuser, said reflective side being at least partly reflective to the electromagnetic radiation. The polarizer transmits electromagnetic radiation having a predefined polarization and reflects electromagnetic radiation not having the predefined polarization back to the diffuser. The diffuser scatters, in a non-polarization-maintaining manner, at least one portion of the reflected-back electromagnetic radiation not having the predefined polarization.

16 Claims, 4 Drawing Sheets

DEVICE FOR GENERATING POLARIZED ELECTROMAGNETIC RADIATION AND PROJECTOR

RELATED APPLICATIONS

This application claims the priority of German application no. 10 2012 210 773.8 filed Jun. 25, 2012, the entire content of which is hereby incorporated by reference.

FIELD OF THE INVENTION

The invention relates to a device for generating polarized electromagnetic radiation and to a projector. The device for generating polarized electromagnetic radiation has a polarizer, which is arranged in a beam path of the electromagnetic radiation. The polarizer is embodied such that it transmits electromagnetic radiation having a predefined polarization.

BACKGROUND OF THE INVENTION

Projectors (beamers) are regularly used nowadays for optically representing data. A projector of this type projects the data to be represented in the form of individual still and/or moving images onto a projection screen, for example. It is known, in the case of a conventional projector, to generate the required excitation radiation with the aid of a conventional discharge lamp, that is to say for example with the aid of an ultra-high pressure mercury-vapor lamp. LARP (Laser Activated Remote Phosphor) technology has also already been used recently. In this technology, a conversion element which is arranged at a distance from the electromagnetic radiation source and comprises or consists of luminophore is irradiated with excitation radiation, in particular an excitation beam (pump beam, pump laser beam). As an alternative thereto, the conversion element can also be arranged directly on the radiation source. Furthermore, electromagnetic radiation that is not laser radiation can also be used as excitation radiation. By way of example, an LED can be used as radiation source. The excitation radiation of the excitation beam is absorbed by the luminophore and converted into conversion radiation (emission radiation) whose wavelength and thus spectral properties and/or color are determined by the conversion properties of the luminophore. By way of example, in the case of a down-conversion, the excitation radiation of the electromagnetic radiation source is converted by the irradiated luminophore into conversion radiation having longer wavelengths than that of the excitation radiation. By way of example, blue excitation radiation (blue laser light) can thus be converted into red or green conversion radiation (conversion light, illumination light) with the aid of the conversion element. An up-conversion is also known, wherein the excitation radiation of the electromagnetic radiation source is converted by the irradiated luminophore into conversion radiation having shorter wavelengths than that of the excitation radiation.

Furthermore, it is known, in projection applications for image generation, to use liquid crystal devices, for example liquid crystal displays (LCDs) or LCOS (liquid crystal on silicon) components. The liquid crystal devices are illuminated with illumination light and the image representation is effected depending on image data, depending on which the LCDs or LCOS components are driven. For the illumination of the LCDs or LCOS components, polarized illumination light is required for image representation. A radiation source that generates polarized light can be used for generating the polarized illumination light. As an alternative thereto, it is possible to use a radiation source that generates unpolarized light, which is polarized before it impinges on the corresponding liquid crystal device.

The generation of polarized light from unpolarized light requires the use of polarizers, which can lead to high optical losses. In the case of the radiation sources which generate polarized light, for example laser light, and which act directly on the LCDs or LCOS components, no polarization that could lead to the optical losses is required, in principle. However, this may be different with the use of LARP technology, since the wavelength conversion of the excitation light (for example from blue to green) by means of a corresponding luminophore may not be polarization-maintaining and the polarization of the laser light may be canceled during the conversion. The unpolarized conversion radiation generated during the conversion may then be polarized again, as a result of which, however, optical losses may arise.

As an alternative to the LCD- or LCOS-based projectors it is known to use DMD (Digital Micromirror Device)-based projectors, in which a polarization of the light is not necessary.

SUMMARY OF THE INVENTION

In various exemplary embodiments, a device for generating polarized electromagnetic radiation is provided which makes it possible, in a simple and/or cost-effective way, to generate polarized electromagnetic radiation, for example polarized conversion radiation, with high efficiency and/or in a simple manner.

In various exemplary embodiments, a device for generating polarized electromagnetic radiation is provided which makes it possible to generate polarized conversion radiation so efficiently that the polarized conversion radiation can be used as illumination radiation in a projector that uses a liquid crystal device for projection representation.

In various exemplary embodiments, a projector is provided which makes it possible to generate polarized illumination radiation, for example polarized conversion radiation, with high efficiency and/or in a simple manner.

In various exemplary embodiments, a projector is provided which makes it possible to generate the illumination radiation so efficiently that the illumination radiation can be used for illuminating a liquid crystal device.

In various exemplary embodiments, a device for generating polarized electromagnetic radiation is provided. The device has a diffuser and a polarizer. The diffuser is arranged in a beam path of the electromagnetic radiation. The polarizer is arranged in the beam path of the electromagnetic radiation, to be precise downstream of the diffuser in the direction of the electromagnetic radiation. The polarizer has a reflective side facing the diffuser, said reflective side being embodied as at least partly reflective to the electromagnetic radiation. The polarizer is embodied such that it transmits electromagnetic radiation having a predefined polarization and reflects electromagnetic radiation not having the predefined polarization back to the diffuser, which scatters, in a non-polarization-maintaining manner, at least one portion of the reflected-back electromagnetic radiation not having the predefined polarization.

The polarizer embodied in a reflective fashion at the reflective side has the effect that electromagnetic radiation not having the predefined polarization is reflected back to the diffuser. At least one portion of the reflected-back electromagnetic radiation not having the predefined polarization is scattered in a non-polarization-maintaining manner in the diffuser. During the scattering process, the polarization of the scattered electromagnetic radiation can change. Therefore, after the scattering process, at least one portion of the scattered electromagnetic radiation has the predefined polarization. Of this portion of the scattered electromagnetic radiation that has the predefined polarization, again a portion leaves the diffuser in the direction of the polarizer. These scattered portions of the electromagnetic radiation which have the predefined polarization after the scattering process pass through the polarizer. The portions of the scattered electromagnetic radiation which do not have the predefined polarization and which leave the diffuser in the direction of the polarizer are once again reflected by the polarizer back to the diffuser, where non-polarization-maintaining scattering can once again be effected, during which electromagnetic radiation having the predefined polarization is again generated. This process can be repeated many times and has the effect that portions of the electromagnetic radiation which originally did not have the predefined polarization have the predefined polarization after one, two or more scattering processes and can then pass through the polarizer. This brings about a particularly high yield of polarized electromagnetic radiation relative to the electromagnetic radiation originally generated, which contributes to a high efficiency in the polarization of the electromagnetic radiation.

The fact that the polarizer is embodied as at least partly reflective to the electromagnetic radiation can mean, for example, that only parts of the polarizer are embodied as reflective and/or that the polarizer reflects only part of the electromagnetic radiation not having the predefined polarization.

In accordance with various exemplary embodiments, the diffuser has a conversion element, which is embodied such that it partly converts at least one portion of the electromagnetic radiation. By way of example, the conversion element converts the electromagnetic radiation before impingement on the polarizer or after reflection at the polarizer. In this context, the non-converted electromagnetic radiation in the beam path upstream or downstream of the conversion element can also be designated as excitation radiation and the converted radiation can also be designated as conversion radiation. By way of example, the conversion element converts the electromagnetic radiation with regard to its wavelength. By way of example, the conversion element shifts the wavelengths of the electromagnetic radiation toward longer wavelength ranges. In other words, by way of example, a down-conversion of the excitation radiation can be carried out with the aid of the conversion element. The conversion element can completely or only partly convert the electromagnetic radiation. In other words, the electromagnetic radiation can have conversion radiation and/or excitation radiation in the beam path downstream of the conversion element. The conversion of the electromagnetic radiation with the aid of the diffuser with the conversion element makes possible, for example, a high yield of polarized converted electromagnetic radiation, that is to say of polarized conversion radiation, and/or makes it possible, for example, to generate the polarized conversion radiation so efficiently that the polarized conversion radiation can be used as illumination radiation in a projector that uses a liquid crystal device for example for projection representation.

In accordance with various exemplary embodiments, the conversion element is embodied such that it scatters, in a non-polarization-maintaining manner, the portion of the reflected-back electromagnetic radiation not having the predefined polarization. This contributes in a particularly simple and/or cost-effective manner to obtaining a high yield of polarized conversion radiation. The conversion element thus performs a double function, to be precise the conversion of the excitation radiation and the scattering of the electromagnetic radiation which is reflected back by the polarizer and which does not have the predefined polarization before the scattering process and which can have the predefined polarization after the scattering process. The scattering and the conversion of the excitation radiation can be effected in a simple physical process. In other words, during the conversion of the excitation radiation, the excitation radiation can be scattered in a non-polarization-maintaining manner. Alternatively or additionally, the physical processes of scattering and conversion can proceed separately from one another in the conversion element. By way of example, scattering non-converting regions, for example scattering particles, which scatter the excitation radiation independently of the conversion of the excitation radiation, can be introduced into the conversion element. The excitation radiation can then be converted in the conversion element outside the scattering regions.

In accordance with various exemplary embodiments, the diffuser has a scattering element, which is embodied such that it scatters, in a non-polarization-maintaining manner, the portion of the reflected-back electromagnetic radiation not having the predefined polarization. In the scattering element, only a scattering of the electromagnetic radiation is effected, and no conversion of the electromagnetic radiation is effected. The scattering element can be arranged as an alternative or in addition to the conversion element. If the scattering element is arranged in addition to the conversion element and the conversion element is embodied such that it can scatter the electromagnetic radiation, then the scattering element can scatter the electromagnetic radiation in addition to the conversion element. If the scattering element is arranged in addition to the conversion element and the conversion element is embodied such that it cannot scatter the electromagnetic radiation, then the scattering element performs the function of scattering of the reflected-back electromagnetic radiation not having the predefined polarization. The scattering element can for example be embodied as a volume scatterer and/or comprise scattering particles. The scattering element contributes in a simple manner to ensuring that the electromagnetic radiation which does not have the predefined polarization and which is reflected back to the diffuser by the polarizer is scattered in a non-polarization-maintaining manner, as a result of which the scattered electromagnetic radiation has at least proportionally electromagnetic radiation having the predefined polarization, which can then pass through the polarizer. The scattering element thus contributes in a simple manner to generating the polarized electromagnetic radiation with high efficiency.

In accordance with various exemplary embodiments, one, two or more reflective surfaces are arranged at one, two or more sides of the conversion element or of the scattering element. By way of example, the conversion element has a plurality of sides and one of the reflective surfaces is arranged at least at one of said sides. Alternatively or additionally, the scattering element can have a plurality of sides and one of the reflective surfaces is arranged for example at one of the sides of the scattering element. By way of example, the reflective sides can be arranged at the side which faces the polarizer or at the side which faces away from the polarizer, and which are arranged perpendicular to the beam path of the electromagnetic radiation, wherein these sides are then embodied as at least partly transmissive to the electromagnetic radiation. By way of example, the sides facing and/or facing away from the polarizer can have one, two or more cutouts for transmitting the electromagnetic radiation. Alternatively or additionally, the reflective surfaces can be arranged at the sides which connect the facing side to the facing-away side and which are arranged parallel to the beam path of the electromagnetic radiation.

The reflective surfaces can contribute to ensuring that electromagnetic radiation which does not leave the conversion element or the scattering element in the direction of the polarizer is reflected back into the conversion element or the scattering element. In the case of non-converted excitation radiation the latter can be converted after reflection at one of the reflective surfaces. In the case of electromagnetic radiation which does not have the predefined polarization, the latter can be scattered and then have the predefined polarization. This can contribute to a high yield of polarized electromagnetic radiation and/or of conversion radiation and to a high efficiency of the device for generating the polarized electromagnetic radiation.

In accordance with various exemplary embodiments, the reflective surfaces scatter, in a non-polarization-maintaining manner, the portion of the reflected-back electromagnetic radiation not having the predefined polarization. By way of example, the portion of the reflected-back electromagnetic radiation which does not have the predefined polarization can pass through the conversion element or the scattering element and may not leave the conversion element or scattering element in the direction of the polarizer, but rather may impinge on one of the reflective surfaces. The portion is reflected and simultaneously scattered at the corresponding reflective surface, wherein this scattering process may be non-polarization-maintaining. Therefore, as an alternative or in addition to the scattering conversion element and/or the scattering element, the reflective surface can contribute to ensuring that reflected-back electromagnetic radiation which does not have the predefined polarization before the scattering process has the predefined polarization after the scattering process. Consequently, the reflective surface can contribute to increasing the yield of polarized electromagnetic radiation and/or the efficiency of the device for generating the polarized electromagnetic radiation. By way of example, the conversion element can be embodied such that it only converts and does not scatter the excitation radiation, in which case the non-polarization-maintaining scattering process is then effected in the diffuser by scattering at the reflective surfaces.

In accordance with various exemplary embodiments, the diffuser has a housing. The conversion element and/or the scattering element are/is arranged in the housing. The reflective surface or the reflective surfaces is/are if appropriate arranged at inner walls of the housing or formed by the inner walls, for example. By way of example, the inner walls of the housing can form the reflective surfaces. This can contribute in a particularly simple manner to embodying the diffuser with the conversion element or the scattering element and the reflective surfaces. By way of example, the housing can be open in the beam path toward the polarizer and can be at least substantially closed at the remaining sides of the conversion element or scattering element and have the reflective surfaces for example at all its inner walls facing the conversion element or the scattering element. As a result, a particularly large part of the outer surface of the conversion element or of the scattering element is surrounded by reflective surfaces.

In accordance with various exemplary embodiments, the polarizer is arranged at the diffuser. By way of example, the polarizer is arranged in direct physical contact at the diffuser. By way of example, the polarizer is fixed to the diffuser. Arranging the polarizer in direct physical contact with the diffuser contributes to ensuring that particularly few optical losses can occur on the path between the diffuser and the polarizer, since this path is minimized. Furthermore, this can contribute to making it possible for the device for generating the polarized electromagnetic radiation to be made particularly small.

In accordance with various exemplary embodiments, an optical lens is arranged between the diffuser and the polarizer. The polarizer is thus arranged in a manner spaced apart from the diffuser. The optical lens can be a collimation lens, for example, which collimates the electromagnetic radiation emerging from the diffuser in the direction of the polarizer. The collimation lens has the effect that the light which reaches the polarizer is collimated. The light which passes through the polarizer is then both collimated and polarized with the predefined polarization. Consequently, only portions of the electromagnetic radiation which are incorrectly polarized with regard to their axial direction of propagation are reflected by the polarizer back to the optical lens and the diffuser, in which they can then be scattered in a non-polarization-maintaining manner, as a result of which electromagnetic radiation having the predefined polarization is again generated at least proportionally.

In accordance with various exemplary embodiments, the diffuser has a first side facing the polarizer and a second side facing away from the polarizer. The beam path of the electromagnetic radiation completely penetrates through the diffuser from the second side to the first side. In other words, the electromagnetic radiation radiates through the diffuser. By way of example, the electromagnetic radiation leaving the diffuser in the direction of the polarizer has at least one direction component which is parallel and equidirectional to the direction of the electromagnetic radiation which is coupled into the diffuser by a radiation source that generates the electromagnetic radiation. If the housing is provided, then the housing can have a cutout for example at its side facing away from the polarizer, through which cutout the electromagnetic radiation can penetrate into the housing or in which cutout the radiation source can be arranged.

In accordance with various exemplary embodiments, the diffuser has the first side facing the polarizer, and the electromagnetic radiation enters into the diffuser on the first side and leaves the diffuser on the first side. In this case, the beam path of the electromagnetic radiation does not completely penetrate through the diffuser. In other words, the electromagnetic radiation enters into the diffuser on the same side at which it leaves the diffuser again in the direction of the polarizer after reflection at the reflective surfaces or after scattering in the diffuser. By way of example, the electromagnetic radiation which penetrates into the diffuser has a direction having a direction component which is parallel and opposite to the direction of the electromagnetic radiation which leaves the diffuser in the direction of the polarizer. By way of example, a mirror can be arranged in the beam path between the diffuser and polarizer, for example between the optical lens and the polarizer, which mirror reflects the electromagnetic radiation coming from the radiation source toward the diffuser and transmits the electromagnetic radiation directed from the diffuser in the direction toward the polarizer. By way of example, the mirror can be embodied as specularly reflective to the excitation radiation and reflect the excitation radiation toward the conversion element and the mirror can be transmissive to the conversion radiation and transmit the conversion radiation toward the polarizer. The coupling-in of the electromagnetic radiation on the same side of the diffuser on which the electromagnetic radiation is coupled out in the direction toward the polarizer can contribute to the reflective surfaces of the housing being optimally utilized.

In accordance with various exemplary embodiments, the device for generating the polarized electromagnetic radiation has the radiation source, wherein the radiation source has for example a light-emitting component, for example a diode and/or a laser, for example, a laser diode.

In various exemplary embodiments, a projector is provided. The projector has the device as claimed in any of the preceding claims for generating projection radiation. By way of example, the device can serve as a projection light source of the projector.

In accordance with various exemplary embodiments, the projector has a liquid crystal device. The liquid crystal device is arranged in the beam path of the illumination radiation and generates a projection representation depending on predefined image data. This makes it possible to use polarized conversion radiation in a liquid-crystal-based projector in a simple manner. The liquid crystal device has a multiplicity of liquid crystal cells, wherein each of the liquid crystal cells can span a dedicated color space, for example. By way of example, each liquid crystal cell has a red-transmitting, a green-transmitting and a blue-transmitting region. The color space is then an RGB color space, for example. The device for generating the polarized electromagnetic radiation can then be used for irradiating the liquid crystal device, for example with polarized conversion radiation.

BRIEF DESCRIPTION OF THE DRAWINGS

Exemplary embodiments of the invention are illustrated in the figures and are explained in greater detail below.

In the figures.

DETAILED DESCRIPTION OF THE DRAWINGS

In the following detailed description, reference is made to the accompanying drawings, which form part of this description and which show for illustration purposes specific exemplary embodiments in which the invention can be implemented. In this regard, direction terminology such as, for instance, at the "top", at the "bottom", at the "front", at the "back", "front", "rear", etc. is used with reference to the orientation of the figure(s) described. Since components of exemplary embodiments can be positioned in a number of different orientations, the direction terminology serves for illustration purposes and is not restrictive in any way at all. It goes without saying that other exemplary embodiments can be used and structural or logical changes can be made, without departing from the scope of protection of the present invention. It goes without saying that the features of the different exemplary embodiments described herein can be combined with one another, unless specifically indicated otherwise. The following detailed description should therefore not be interpreted in a restrictive sense, and the scope of protection of the present invention is defined by the appended claims.

In the context of this description, the terms "connected" and "coupled" are used for describing either a direct or an indirect connection, and a direct or indirect coupling. In the figures, identical or similar elements are provided with identical reference signs, insofar as is expedient.

A radiation source can be a light-emitting component, for example. The light-emitting component can be embodied for example as a light-emitting diode (LED) and/or a laser diode. In various exemplary embodiments, the light-emitting component can be part of an integrated circuit. Furthermore, a plurality of light-emitting components can be provided, for example accommodated in a common housing.

Figure 1:
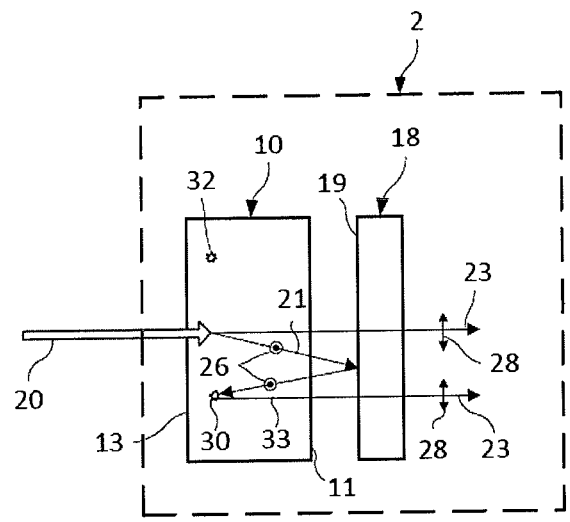
FIG. 1 shows an exemplary embodiment of a device for generating polarized electromagnetic radiation.

FIG. 1 shows an exemplary embodiment of a device 2 for generating polarized electromagnetic radiation 23. The device 2 for generating polarized electromagnetic radiation 23 has a diffuser 10 and a polarizer 18.

The diffuser 10 has a plurality of scattering centers, for example a first scattering center 30 and a second scattering center 32. In FIG. 1, for illustration purposes, only two scattering centers 30, 32 are depicted and both scattering centers are depicted as relatively large; in actual fact, the diffuser 10 can have a multiplicity of scattering centers and/or very small scattering centers.

Electromagnetic radiation 20 which is directed onto the diffuser 10 and is coupled into the diffuser 10 can penetrate through the diffuser 10 and/or be scattered in the diffuser 10 for example at the first and/or second scattering center 30, 32. A beam path of the electromagnetic radiation 20 extends from the diffuser 10 toward the polarizer 18.

The electromagnetic radiation 20 emerges from the diffuser 10 at least partly in the direction toward the polarizer 18. A portion of the electromagnetic radiation 20 has a predefined polarization 28, which is identified in the figures by double-headed arrows lying in the plane of the drawing. The remaining portions of the electromagnetic radiation 20 have a different polarization 26, which does not correspond to the predefined polarization 28, wherein the different polarization 26 is identified in the figures by a circle 26 with a dot arranged centrally therein.

The polarizer 18 has a reflective side 19 facing the diffuser 10, said reflective side being embodied as at least partly reflective to the electromagnetic radiation 20. The fact that the reflective side 19 of the polarizer 18 is embodied as at least partly reflective can mean, for example, that the reflective side 19 is embodied as reflective to the electromagnetic radiation 20 which impinges on it and which does not have the predefined polarization 28, that only part of the reflective side 19 is embodied as reflective to the electromagnetic radiation 20 which impinges on it and which does not have the predefined polarization 28, and/or that only a portion of the electromagnetic radiation 20 which impinges on the reflective side 19 and which does not have the predefined polarization 28 is reflected. The polarizer 18 transmits the electromagnetic radiation 20 having the predefined polarization 28 and blocks the electromagnetic radiation 20 not having the predefined polarization 28. The portions of the electromagnetic radiation 20 which are not transmitted by the polarizer 18 are at least partly reflected by the polarizer 18 back to the diffuser 10. A beam path of the reflected electromagnetic radiation 21 extends from the polarizer 18 toward the diffuser 10.

Electromagnetic radiation 21 reflected back by the polarizer 18 can be scattered in a non-polarization-maintaining manner at the scattering centers 30, 32, for example at the second scattering center 32. Since the reflected-back electromagnetic radiation 21 does not have the predefined polarization 28 and the scattering process at the scattering centers 30, 32 is non-polarization-maintaining, at least one portion of scattered electromagnetic radiation 33 has the predefined polarization 28, wherein a portion of this scattered electromagnetic radiation 33 having the predefined polarization 28 can emerge from the diffuser 10 in the direction of the polarizer 18. This scattered electromagnetic radiation 33 having the predefined polarization 28 passes through the polarizer 18. A beam path of the scattered electromagnetic radiation 33 extends for example from the diffuser 10 toward the polarizer 18.

The polarizer 18 embodied in reflective fashion and the diffuser 10 with its scattering centers 30, 32 contribute to ensuring that electromagnetic radiation 20 which initially does not have the predefined polarization 28 and is therefore reflected back by the polarizer 18 to the diffuser 10 can be scattered in a non-polarization-maintaining manner in the diffuser 10, as a result of which scattered electromagnetic radiation 33 having the predefined polarization 28 can be generated. The scattered electromagnetic radiation 33 having the predefined polarization 28 can then be used as electromagnetic radiation 23 polarized with the predefined polarization 28. Consequently, even electromagnetic radiation 20 which originally does not have the predefined polarization 28 can be polarized with the predefined polarization 28. This leads to a particularly high yield of polarized electromagnetic radiation 23 relative to the electromagnetic radiation 23 coupled in. This leads to a particularly high efficiency of the device 2 for generating the polarized electromagnetic radiation 23.

The (re)use of the reflected-back electromagnetic radiation 21 not having the predefined polarization 28 for generating the electromagnetic radiation 23 having the predefined polarization 28 can also be designated as reconditioning or as recycling of the reflected-back electromagnetic radiation 21. In other words, the device 2 for generating the polarized electromagnetic radiation 23 conditions non-usable electromagnetic radiation 23 not having the predefined polarization 28 and/or recycles it and in the process generates usable polarized electromagnetic radiation 23, as a result of which the efficiency of the device 2 for generating the polarized electromagnetic radiation 23 is particularly high.

Figure 2:
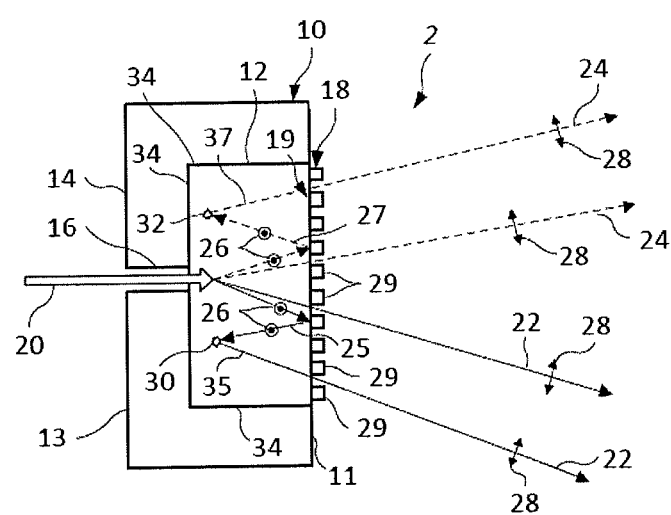
FIG. 2 shows an exemplary embodiment of a device for generating polarized electromagnetic radiation.

FIG. 2 shows an exemplary embodiment of the device 2 for generating the polarized electromagnetic radiation 23, the basic principle of which for generating the polarized electromagnetic radiation 23 corresponds to the basic principle for generating the polarized electromagnetic radiation 23 as explained with reference to FIG. 1. In the case of the exemplary embodiment in accordance with FIG. 2, the device 2 has a diffuser 10, which has a conversion element 12. A housing 14 can optionally be arranged, in which the conversion element 12 is arranged. The diffuser 10 can thus have a conversion element 12 and a housing 14. The housing 10 can have a cutout 16, for example, through which the beam path of the electromagnetic radiation 20 extends and through which the electromagnetic radiation 20 can be coupled into the diffuser 10. The polarizer 18 is arranged at the conversion element 12. By way of example, the polarizer 18 is arranged with direct physical contact onto the conversion element 12. The polarizer 18 has a polarization grating, for example, which has, for example, a multiplicity of grating elements 29 extending in elongate fashion, said grating elements being illustrated in a manner lying one above another in sectional illustration in FIG. 2. By way of example, non-converted polarized excitation radiation 22 or polarized conversion radiation 24 is present beyond the polarizer 18.

The conversion element 12 has one, two or more luminophores or is formed therefrom. In this context, the electromagnetic radiation 20 that is coupled into the conversion element 12 can also be designated as excitation radiation. The excitation radiation excites the luminophores in the conversion element 12 to emit light, such that at least part of the excitation radiation is converted into conversion radiation. The remaining part of the excitation radiation can be designated as non-converted excitation radiation.

Portions of the non-converted excitation radiation and of the conversion radiation which have the predefined polarization 28 can pass through the polarization 18 as polarized excitation radiation 22 and as polarized conversion radiation 24. The remaining portions of the excitation radiation and of the conversion radiation are reflected by the reflective side 19 of the polarizer 18 back into the conversion element 12. Reflected-back excitation radiation 25 can be converted in the conversion element 12, as a result of which a yield during the conversion of the excitation radiation can be increased. Furthermore, the reflected-back excitation radiation 25 and/or reflected-back conversion radiation 27 can be scattered in a non-polarization-maintaining manner in the conversion element, for example at the first or second scattering center 30, 32. During the non-polarization-maintaining scattering process, a portion of the reflected-back excitation light 25 or of the reflected-back conversion light 24 is polarized such that it has the predefined polarization 28. Scattered excitation radiation 35 and/or scattered conversion radiation 37 having the predefined polarization 28 can pass directly or indirectly to the polarizer 18 and pass through the polarizer 18.

Polarized conversion radiation 24 and/or polarized excitation radiation 22 can be generated in this way. The ratio of polarized excitation radiation 22 to polarized conversion radiation 24 can be set depending on a material of the conversion element 12 and/or depending on the luminophores used in the conversion element 12. By way of example, the excitation radiation coupled in can be completely or at least almost completely converted, such that in the beam path downstream of the conversion element 12 no more non-converted excitation radiation 22 at all or at least approximately no more non-converted excitation radiation 22 is present, impinges on the polarizer 18 and/or penetrates through the polarizer 18. As an alternative thereto, however, the conversion element 12 can also be embodied such that in a targeted manner a predefined portion of the excitation radiation leaves the conversion element 12, impinges on the polarizer 18 and/or passes through the polarizer 18 as polarized excitation radiation 22. A targeted mixing of the polarized excitation radiation 22 with the polarized conversion radiation 24 is achieved as a result. This can be used for example for targeted color representation by color mixing.

The conversion element 22 comprises luminophores, for example one, two or more luminophore types and/or a luminophore mixture. The luminophores can be, for example, phosphorescent or fluorescent luminophores. The luminophores can comprise phosphor, for example, and/or emit white, yellow, green or red light upon corresponding excitation. The electromagnetic radiation 26 impinges on the conversion element 22. The electromagnetic radiation 26 excites the luminophores to emit light in the conversion element. In this context, the electromagnetic radiation 26 can also be designated as excitation radiation. The excited luminophores then emit conversion radiation 28. In other words, the excitation radiation is converted into conversion radiation 28.

Depending on the luminophores used, the polarized conversion radiation 24 can comprise colored or white light, for example. By way of example, the excitation radiation comprises blue light or UV light. Suitable luminophores are known in the prior art. Customary luminophores are, for example, garnets or nitrides, silicates, nitrides, oxides, phosphates, borates, oxynitrides, sulfides, selenides, aluminates, tungstates, and halides of aluminum, silicon, magnesium, calcium, barium, strontium, zinc, cadmium, manganese, indium, tungsten and other transition metals, or rare earth metals such as yttrium, gadolinium or lanthanum, which are doped with an activator such as, for example, copper, silver, aluminum, manganese, zinc, tin, lead, cerium, terbium, titanium, antimony or europium. In various embodiments of the invention, the luminophore is an oxidic or (oxy)nitridic luminophore such as a garnet, orthosilicate, nitrido(alumo)silicate, nitride or nitridoorthosilicate, or a halide or halophosphate. Concrete examples of suitable luminophores are strontium chloroapatite:Eu((Sr,Ca)5(PO4)3Cl:Eu; SCAP), yttrium aluminum garnet:cerium (YAG:Ce) or CaAlSiN3:Eu. By way of example, the luminophores can comprise a Ce3+ doped garnet luminophore, in particular yttrium aluminum garnet (YAG) or variants thereof having the general formula (Y,Lu,Gd)3(Al,Ga)5O12:Ce3+ or mixtures of such a garnet luminiphore with red-emitting, Eu2+ doped nitride luminophores of the type (Ca,Sr)AlSiN3:Eu2+ or (Ca,Sr,Ba)2Si5N8:Eu2+. Furthermore, the luminophore or luminophore mixture can contain, for example, particles having light-scattering properties and/or auxiliaries. Examples of auxiliaries include surfactants and organic solvents. Examples of light-scattering particles are, for example, oxide particles such as silicon dioxide, gold, silver and/or metal oxide particles. The conversion element 12 can for example completely or only partly consist of crystal or ceramic. Furthermore, by way of example, the crystal converter element can be a single crystal. Independently of this, the conversion element 12 can comprise a matrix material, which can comprise for example diamond, water glass, glass or $Al_2O_3$. Other luminophores known from remote phosphor applications are also conceivable.

Reflective surfaces 34 can be arranged and/or embodied at sides of the conversion element 12. By way of example, the reflective surfaces 34 can be arranged at inner walls of the housing 14 which face the conversion element 12 and/or which adjoin the conversion element 12 or the inner walls can be embodied as reflective surfaces 34. The reflective surfaces 34 can be embodied as partly or completely reflective to the excitation radiation and/or the conversion radiation. The reflective surfaces 34 can contribute to ensuring that non-converted excitation radiation or conversion radiation, for example reflected-back excitation radiation 25 or reflected-back conversion radiation 27, which impinges on the inner walls, is reflected back into the conversion element 12 and/or toward the polarizer 18. With reference to the non-converted excitation radiation, this can contribute to increasing an efficiency and/or a degree of conversion, since the non-converted excitation radiation can be converted after reflection at the reflective surfaces 34. Furthermore, the reflective surfaces 34 can contribute to increasing the efficiency during polarization, since the reflected-back excitation radiation 25 and/or the reflected-back conversion radiation 27 which does not have the predefined polarization 28 can be scattered in a non-polarization-maintaining manner, as a result of which polarized excitation radiation 22 or polarized conversion radiation 24 can be generated.

Figure 3:
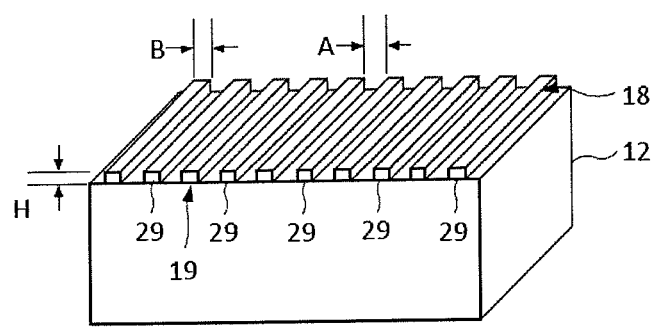
FIG. 3 shows an exemplary embodiment of a conversion element with a polarizer.

FIG. 3 shows a perspective illustration of an exemplary embodiment of the conversion element 12 and of the polarizer 18. The grating elements 29 of the polarizer 18 have a height H, a width B and a distance A between one another. The height H is chosen for example such that the electromagnetic radiation 20 not having the predefined polarization 28 can be reflected back to the conversion element 12, and that as little electromagnetic radiation 23 as possible which has the predefined polarization 28 is absorbed or reflected. By way of example, the grating elements 29 of the polarizer 18 can have a height H of between 1 and 1000 nanometers, for example between 10 and 500 nanometers, for example between 30 and 200 nanometers. Furthermore, the grating elements 29 of the polarizer 18 can have for example a width B of between 10 and 1000 nanometers, for example between 100 and 500 nanometers, for example between 150 and 250 nanometers. The distance A can be chosen for example such that for example half of the first side 11 of the conversion element 12, said first side facing the polarizer 18, is free of grating elements 29 of the polarizer 18, for example such that ⅔ of the area is free of grating elements 29 of the polarizer 18. By way of example, a ratio of width B to distance A can be between 20 and 60%, for example between 30 and 50%.

The polarizer 18, in particular the grating elements 29, can be produced for example by means of interference lithography, in a mask process, with the aid of a stamp in a photoresistive layer and/or in a nano-imprint method. The grating elements 29 are embodied as reflective at their sides facing the diffuser 10, whereby the reflective side 19 of the polarizer 18 is formed. The grating elements 29 of the polarizer 18 can comprise silver, gold and/or aluminum, for example, in their reflective regions.

A reflectivity of the reflective surfaces 34, for example of the inner walls of the housing 14, and/or of the reflective side 19 of the polarizer 18, in particular of the reflective regions of the grating elements 29, can be for example between 70% and 99.99%, for example between 90 and 99%, for example between 95 and 98%.

The use of the reflective polarizer 18 can contribute for example to ensuring that, in the case of a predefined target color locus given by a ratio of non-converted excitation radiation 22 to conversion radiation 24, less luminophore can be used, since the degree of conversion is increased.

The polarized conversion radiation 24 and/or the polarized excitation radiation 22 can have, for example, wavelengths that lie in the visible wavelength range. As an alternative thereto, the wavelengths can lie in the non-visible range, for example in the UV range or in the infrared range.

Figure 4:
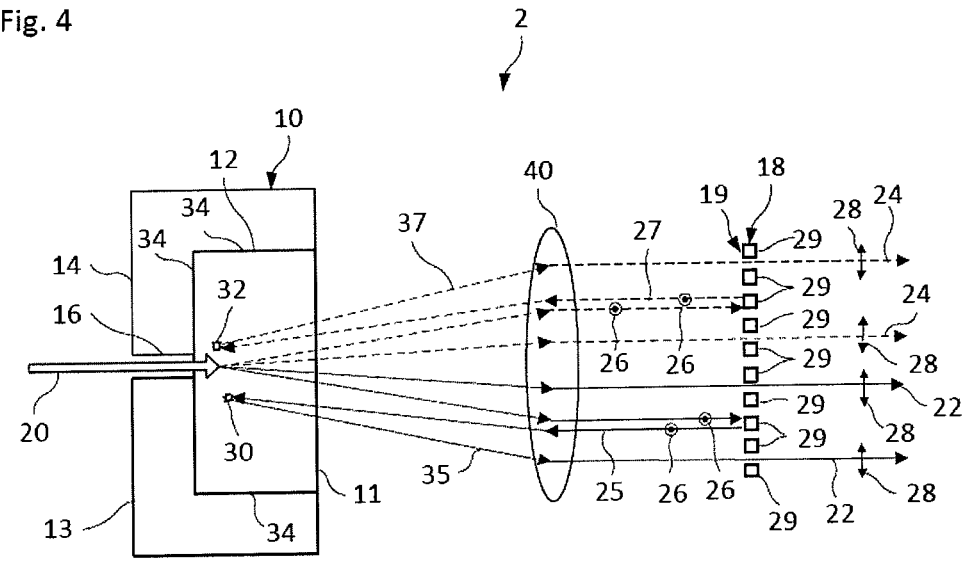
FIG. 4 shows an exemplary embodiment of a device for generating polarized electromagnetic radiation.

FIG. 4 shows an exemplary embodiment of the device 2 which largely corresponds to the exemplary embodiment of the device as shown in FIG. 2. In contrast to the exemplary embodiment explained in FIG. 2, the exemplary embodiment in accordance with FIG. 4 has an optical lens 40, which is arranged in the beam path of the excitation radiation and/or of the conversion radiation between the conversion element 12 and the polarizer 18. In this exemplary embodiment, the polarizer 18 is not arranged on the conversion element 12, but rather in a manner spaced apart from the latter. The optical lens 40 is a collimation lens, for example, which collimates excitation radiation and conversion radiation coming from the conversion element 12 and deflects this radiation in the direction toward the polarizer 18. The optical lens 40 thus collimates the excitation radiation and conversion radiation, such that collimated polarized excitation radiation 22 and collimated polarized conversion radiation 24 pass through the polarizer 18. The optical lens 40 can contribute to a high efficiency of the device 2, since generally the collimation of electromagnetic radiation can be non-polarization-maintaining since the excitation radiation and the conversion radiation are polarized only after collimation.

Figure 5:
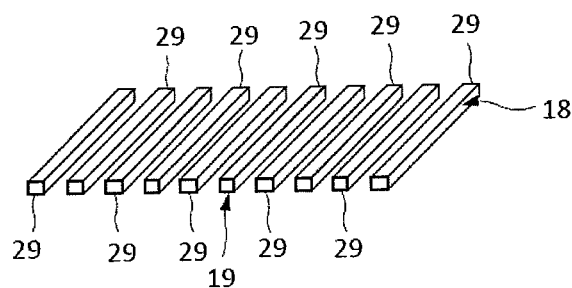
FIG. 5 shows an exemplary embodiment of a polarizer.

FIG. 5 shows an exemplary embodiment of the polarizer 18, which is embodied independently of the conversion element 12 in accordance with FIG. 4. Otherwise, the polarizer 18 shown in FIG. 5 may correspond to the polarizer 18 explained with reference to FIG. 3.

Figure 6:
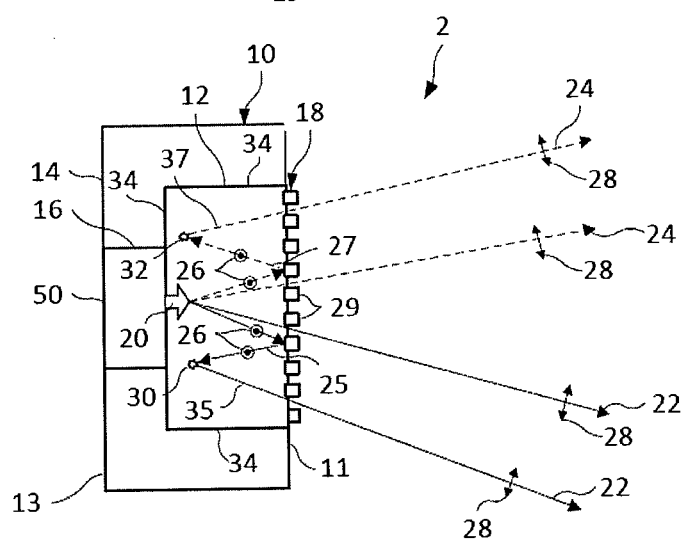
FIG. 6 shows an exemplary embodiment of a device for generating polarized electromagnetic radiation.

FIG. 6 shows an exemplary embodiment of the device 2 which largely corresponds to the exemplary embodiment of the device 2 as explained with reference to FIG. 2, in which case, in contrast to the exemplary embodiment explained with reference to FIG. 2, the exemplary embodiment shown in FIG. 6 has a radiation source 50 arranged in the cutout 16 of the housing 14. The radiation source 50 generates the electromagnetic radiation 20, for example the excitation radiation. This ensures that the entire electromagnetic radiation 20 or excitation radiation generated by the radiation source 50 is coupled into the conversion element 12. The radiation source can comprise a light-emitting component, for example a light-emitting diode (LED), a laser diode or an organic light-emitting diode (OLED). Furthermore, the radiation source 50 can comprise two or more light-emitting components, for example light-emitting diodes, laser diodes or organic light-emitting diodes, wherein the radiation source 50 can then be designated for example as a light engine. It is thus possible to provide a device comprising a light engine which emits polarized light.

Figure 7:
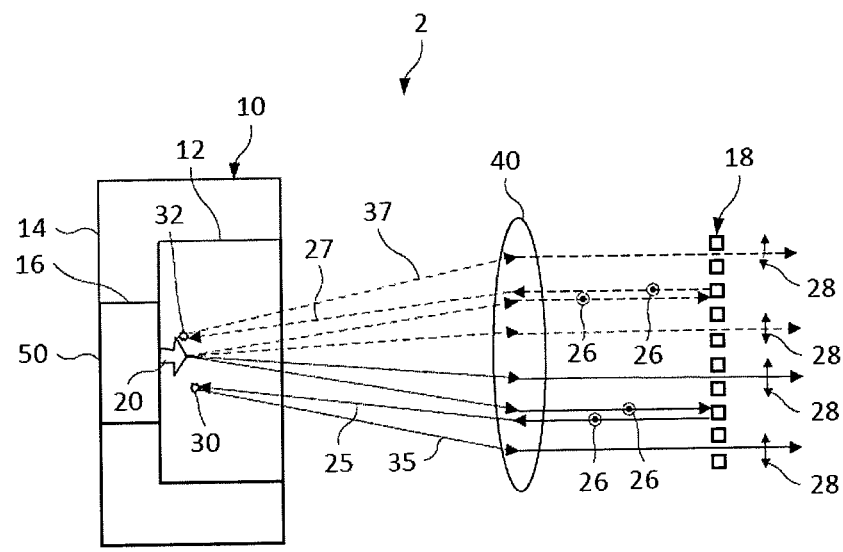
FIG. 7 shows an exemplary embodiment of a device for generating polarized electromagnetic radiation.

FIG. 7 shows an exemplary embodiment of the device 2 which largely corresponds to the exemplary embodiment of the device 2 as explained with reference to FIG. 4, in which case, in contrast thereto, the exemplary embodiment of the device 2 as shown in FIG. 7 has the electromagnetic radiation source 50 in a manner corresponding to the exemplary embodiment of the device 2 as shown in FIG. 6. The radiation source 50 is arranged in the cutout 16 of the housing 14. The radiation source 50 can be embodied for example as explained with reference to FIG. 6.

Figure 8:
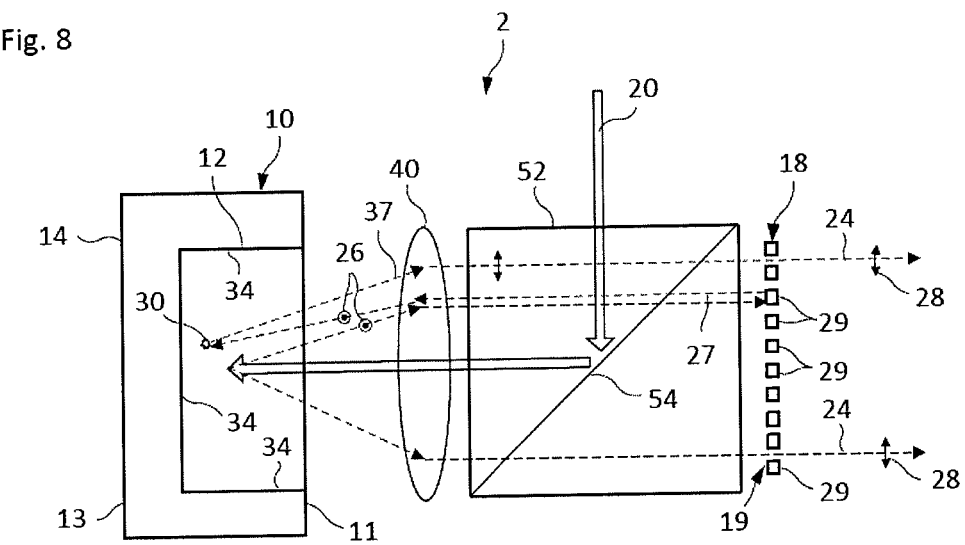
FIG. 8 shows an exemplary embodiment of a device for generating polarized electromagnetic radiation.

FIG. 8 shows an exemplary embodiment of the device 2 which largely corresponds to the exemplary embodiment of the device 2 as explained with reference to FIG. 4, in which case, in contrast thereto, in the exemplary embodiment of the device 2 as shown in FIG. 8, the electromagnetic radiation 20 is coupled into the diffuser 10 on the same side of the diffuser 10, for example the first side 11, as said radiation is coupled out from the diffuser 10 in the direction toward the polarizer 18. By way of example, in this exemplary embodiment, the excitation radiation is coupled in on the first side 11 of the diffuser 10 and the conversion radiation is coupled out on the first side 11 of the diffuser 10. For this purpose, the device 2 has a mirror device 52, for example, which has a semitransparent mirror 54, for example. By way of example, the semitransparent mirror 54 is embodied as reflective to the electromagnetic radiation 20, for example the excitation radiation, and reflects said radiation toward the conversion element 12 and the semitransparent mirror 54 is embodied as transmissive to the conversion radiation and transmits the conversion radiation 24 coming from the conversion element 12 to the polarizer 18. This makes it possible for the conversion element 12 to be completely embedded into the housing 14 at the sides not facing the polarizer 18, and for the inner walls of the housing 14 to be completely provided with the reflective surfaces 34, such that the reflection effects are maximized at the inner walls of the housing 14. This can contribute to a particularly high yield of conversion radiation and/or polarized conversion radiation 24.

Figure 9:
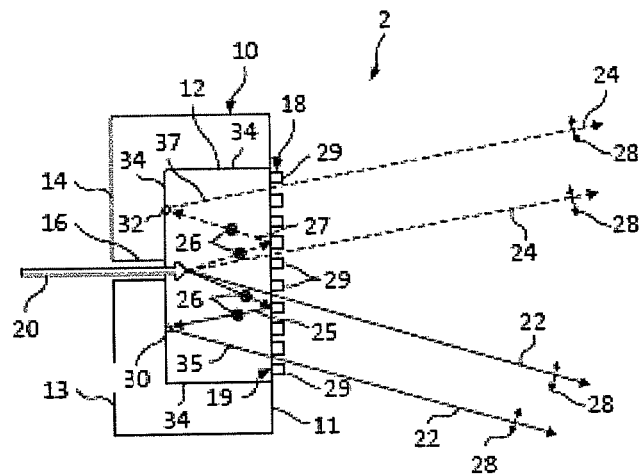
FIG. 9 shows an exemplary embodiment of a device for generating polarized electromagnetic radiation.

FIG. 9 shows an exemplary embodiment of the device 2 which largely corresponds to the exemplary embodiment of the device 2 as explained with reference to FIG. 2, wherein, in this exemplary embodiment, the inner walls of the housing 14 have the scattering centers 30, 32. The latter can be embodied in addition or as an alternative to scattering centers in the conversion element 12. The reflected-back excitation radiation 25 and/or the reflected-back conversion radiation 27 which do not have the predefined polarization 28 and which impinge on the inner walls of the housing 14 can then be scattered in a non-polarization-maintaining manner at the reflective surfaces 34, as a result of which polarized excitation radiation 22 or polarized conversion radiation 24 is generated. If the conversion element 12 is embodied such that it does not convert the excitation radiation and/or the conversion radiation, then the scattering function of the diffuser 10 can be performed by the reflective surfaces 34. Otherwise, the yield of polarized excitation radiation 22 and/or of polarized conversion radiation 24 can be increased on account of the scattering properties of the reflective surfaces 34.

Figure 10:
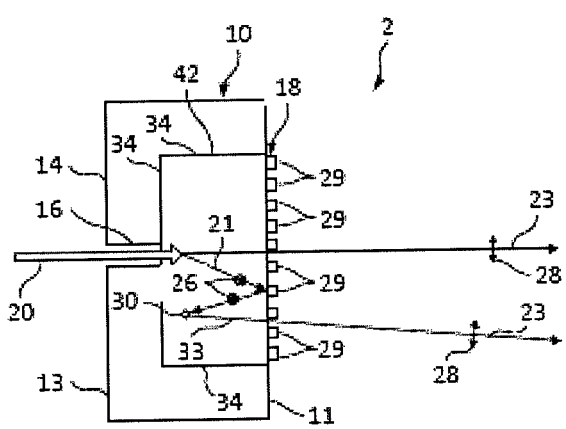
FIG. 10 shows an exemplary embodiment of a device for generating polarized electromagnetic radiation.

FIG. 10 shows an exemplary embodiment of the device 2 which largely corresponds to the exemplary embodiment of the device 2 as explained with reference to FIG. 2, in which case, in contrast thereto, a scattering element 42 is arranged instead of the conversion element 12. The scattering element 42 does not convert the electromagnetic radiation 20. Consequently, only polarized electromagnetic radiation 23 is generated. The scattering element 42 scatters, in a non-polarization-maintaining manner, the electromagnetic radiation 21 reflected by the reflector 18 and not having the predefined polarization 28, and thus generates polarized electromagnetic radiation 23 having the predefined polarization 28.

Figure 11:
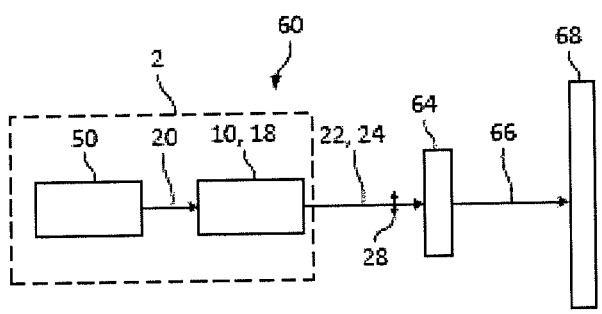
FIG. 11 shows an exemplary embodiment of a projector.

FIG. 11 shows an exemplary embodiment of a projector 60. The projector 60 has the device 2 and a liquid crystal device 64. The radiation source 50 can be arranged in the housing 14 or outside the housing 14 in accordance with FIG. 6 and/or FIG. 7. The polarized excitation radiation 22 and/or the polarized conversion radiation 24 having the predefined polarization 28 impinges on the liquid crystal device 64. The liquid crystal device can be, for example, an LCD device and/or an LCOS device. The liquid crystal device 24 is driven with the aid of a control unit (not illustrated). The control unit controls the liquid crystal device 24 depending on predefined image data. The liquid crystal device 24 influences the polarized excitation radiation 22 and/or the polarized conversion radiation 24, as a result of which the liquid crystal device 24 emits projection radiation 26 toward a projection surface 68, for example a projection screen. On the projection surface 68, the projection radiation 26 generates an image representation, for example individual and/or successive images, for example a film or a computer animation or a computer game.

The invention is not restricted to the exemplary embodiments specified. By way of example, the different exemplary embodiments can be combined with one another. By way of example, the exemplary embodiments shown with reference to FIGS. 9 and 10, in which the reflective surfaces 34 have the scattering centers 30, 32 and respectively in which the diffuser 10 has only the scattering element 42, can also be applied to the exemplary embodiments explained with reference to FIGS. 4, 6, 7 and 8, in which the polarizer 18 is spaced apart from the diffuser 10, in which the electromagnetic radiation source 50 is arranged in the housing 14, and respectively in which the electromagnetic radiation 20 is coupled into the diffuser 10 on the same side as said radiation is coupled out from the diffuser 10. Furthermore, the device 2 can also be used in different applications than the projector 60, for example in all applications in which polarized electromagnetic radiation 23 is required or is advantageous.

The invention claimed is:

1. A device for polarizing electromagnetic radiation, comprising:
    a diffuser arranged in a beam path of the electromagnetic radiation; and
    a polarizer arranged in the beam path of the electromagnetic radiation and downstream of the diffuser in the direction of propagation of the electromagnetic radiation, the polarizer having a reflective side facing the diffuser, said reflective side being at least partly reflective to the electromagnetic radiation,
    wherein the polarizer is configured to transmit electromagnetic radiation having a predefined polarization and to reflect electromagnetic radiation not having the predefined polarization back to the diffuser, and
    wherein the diffuser is configured to scatter, within the diffuser, at least one portion of the reflected-back electromagnetic radiation not having the predefined polarization so that the at least one portion of the electromagnetic radiation becomes electromagnetic radiation having the predefined polarization, the scattered electromagnetic radiation having the predefined polarization emerging from the diffuser in the direction of the polarizer.

2. The device as claimed in claim 1, wherein the polarizer is arranged at the diffuser.

3. The device as claimed in claim 1, further comprising an optical lens arranged in the beam path of the electromagnetic radiation between the diffuser and the polarizer.

4. The device as claimed in claim 1, wherein the diffuser has a first side facing the polarizer and a second side facing away from the polarizer and wherein the beam path of the electromagnetic radiation completely penetrates through the diffuser from the second side to the first side.

5. The device as claimed in claim 1, wherein the diffuser has a first side facing the polarizer, and wherein the beam path of the electromagnetic radiation enters into the diffuser on the first side and leaves the diffuser on the first side, wherein the beam path of the electromagnetic radiation does not completely penetrate through the diffuser.

6. The device as claimed in claim 1, further comprising a radiation source configured to generate the electromagnetic radiation.

7. The device as claimed in claim 6, wherein the radiation source has a light-emitting diode or a laser.

8. A projector having the device as claimed in claim 1 for generating illumination radiation.

9. The projector as claimed in claim 8, further having a liquid crystal device arranged in the beam path of the illumination radiation and which generates a projection representation depending on predefined image data.

10. The device as claimed in claim 1, wherein the diffuser is further configured to convert at least one selected from the group consisting of one portion of the electromagnetic radiation and at the least one portion of the reflected-back radiation not having the predefined polarization into conversion radiation.

11. A device for polarizing electromagnetic radiation, comprising:
    a diffuser arranged in a beam path of the electromagnetic radiation; and
    a polarizer arranged in the beam path of the electromagnetic radiation and downstream of the diffuser in the direction of propagation of the electromagnetic radiation, the polarizer having a reflective side facing the diffuser, said reflective side being at least partly reflective to the electromagnetic radiation,
    wherein the polarizer is configured to transmit electromagnetic radiation having a predefined polarization and to reflect electromagnetic radiation not having the predefined polarization back to the diffuser, the diffuser being configured to scatter, in a non-polarization-maintaining manner, at least one portion of the reflected-back electromagnetic radiation not having the predefined polarization,
    wherein the diffuser has a conversion element configured to convert at least one selected from the group consisting of one portion of the electromagnetic radiation and the at least one portion of the reflected-back electromagnetic radiation not having the predefined polarization.

12. The device as claimed in claim 11, wherein the conversion element is configured to scatter, in the non-polarization-maintaining manner, the at least one portion of the reflected-back electromagnetic radiation not having the predefined polarization.

13. The device as claimed in claim 11, wherein one or more reflective surfaces are arranged at least at one of the sides of the conversion element or of the diffuser.

14. The device as claimed in claim 13, wherein the reflective surfaces scatter, in the non-polarization-maintaining manner, the portion of the reflected-back electromagnetic radiation not having the predefined polarization.

15. The device as claimed in claim 11, wherein the diffuser has a housing, in which at least one selected from the group consisting of the conversion element and the diffuser are arranged, and wherein the reflective surfaces are inner walls of the housing.

16. A device for polarizing electromagnetic radiation, comprising:
    a diffuser arranged in a beam path of the electromagnetic radiation; and
    a polarizer arranged in the beam path of the electromagnetic radiation and downstream of the diffuser in the direction of propagation of the electromagnetic radiation, the polarizer having a reflective side facing the diffuser, said reflective side being at least partly reflective to the electromagnetic radiation,
    wherein the polarizer is configured to transmit electromagnetic radiation having a predefined polarization and to reflect electromagnetic radiation not having the predefined polarization back to the diffuser, the diffuser being configured to scatter, in a non-polarization-maintaining manner, at least one portion of the reflected-back electromagnetic radiation not having the predefined polarization,
    wherein the diffuser has a scattering element configured to scatter, in the non-polarization-maintaining manner, the at least one portion of the reflected-back electromagnetic radiation not having the predefined polarization.

* * * * *